United States Patent
Kirihara et al.

(10) Patent No.: US 7,916,955 B2
(45) Date of Patent: Mar. 29, 2011

(54) IMAGE PROCESSING APPARATUS AND CONTROL METHOD THEREFOR

(75) Inventors: Satoshi Kirihara, Tama (JP); Shuntaro Aratani, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/060,737

(22) Filed: Apr. 1, 2008

(65) Prior Publication Data
US 2008/0247673 A1   Oct. 9, 2008

(30) Foreign Application Priority Data

Apr. 5, 2007   (JP) .................................. 2007-099750

(51) Int. Cl.
G06K 9/36 (2006.01)
G06K 9/46 (2006.01)

(52) U.S. Cl. ........................................ 382/232; 382/303

(58) Field of Classification Search .................. 382/232, 382/234, 302, 303, 304; 345/506; 375/240.26, 375/240.27
See application file for complete search history.

(56) References Cited

U.S. PATENT DOCUMENTS

| | | | |
|---|---|---|---|
| 6,279,067 B1 * | 8/2001 | Callway et al. | 710/260 |
| 7,743,400 B2 * | 6/2010 | Kurauchi | 725/114 |
| 2004/0218672 A1 * | 11/2004 | Bourne et al. | 375/240.12 |

FOREIGN PATENT DOCUMENTS

| | | |
|---|---|---|
| JP | H01-314387 A | 12/1989 |
| JP | 2001-350655 A | 12/2001 |
| JP | 2004-165814 A | 6/2004 |
| JP | 2004-206585 A | 7/2004 |
| JP | 2004-328588 A | 11/2004 |
| JP | 2005-045366 A | 2/2005 |
| JP | 2005-301404 A | 10/2005 |
| JP | 2005-309924 A | 11/2005 |

* cited by examiner

*Primary Examiner* — Phuoc Tran
(74) *Attorney, Agent, or Firm* — Canon USA Inc IP Divison

(57) ABSTRACT

In a first image processing apparatus, a first image processing unit 104 applies image processing to video content stored in a first storage unit. At this time, the first image processing unit stores information relating to detail and progress of the applied image processing in an image processing information storage unit as image processing information. In a case in which the first image processing unit interrupts the image processing being applied and the interrupted image processing is taken over and executed by a second image processing apparatus, the partially processed video content and the corresponding image processing information are transferred to the second image processing apparatus.

8 Claims, 13 Drawing Sheets

FIG. 2

| CONTENT NUMBER | RESOLUTION CONVERSION ALGORITHM ID | COMPLETED FRAME NO. | RESOLUTION BEFORE CONVERSION (HORIZONTAL, VERTICAL) | RESOLUTION AFTER CONVERSION (HORIZONTAL, VERTICAL) |
|---|---|---|---|---|
| 0001 | 3 | 18032 | (720, 480) | (1920, 1080) |
| 0002 | 3 | 54000 | (1280, 720) | (1920, 1080) |
| | | | | |

FIG. 3

| RESOLUTION CONVERSION ALGORITHM | RESOLUTION CONVERSION ALGORITHM ID |
|---|---|
| NEAREST NEIGHBOR | 1 |
| BI-LINEAR | 2 |
| BI-CUBIC | 3 |
| HIGH-FREQUENCY 0 INSERTION | 4 |

FIG. 4

| | CONFIGURATION | | |
|---|---|---|---|
| RTI SECTION | RTIT SECTION HEADER | | |
| | RTIT PAYLOAD | PROCESSING DEVICE ID | (ID OF FIRST IMAGE PROCESSING APPARATUS 100) |
| | | RESOLUTION CONVERSION ALGORITHM ID | (ID OF BI-CUBIC SCHEME) |
| | | PRE-CONVERSION x DIRECTION RESOLUTION INFORMATION | (x-DIRECTION RESOLUTION BEFORE CONVERSION) |
| | | PRE-CONVERSION y DIRECTION RESOLUTION INFORMATION | (y-DIRECTION RESOLUTION BEFORE CONVERSION) |
| | | POST-CONVERSION x DIRECTION RESOLUTION INFORMATION | (x-DIRECTION RESOLUTION AFTER CONVERSION) |
| | | POST-CONVERSION y DIRECTION RESOLUTION INFORMATION | (y-DIRECTION RESOLUTION AFTER CONVERSION) |
| | | CONVERSION COMPLETED FRAME NO. | (NO. OF FRAME AT WHICH CONVERSION IS COMPLETED) |

FIG. 6A

| RESOLUTION CONVERSION ALGORITHM | SECOND IMAGE PROCESSING UNIT CAPABILITY | RESOLUTION CONVERSION CAPABILITY VALUE |
|---|---|---|
| NEAREST NEIGHBOR | × | 1 |
| BI-LINEAR | ○ | 2 |
| BI-CUBIC | ○ | 3 |
| HIGH-FREQUENCY 0 INSERTION | ○ | 4 |

↓ HIGHER CAPABILITY

FIG. 6B

| RESOLUTION CONVERSION ALGORITHM | SECOND IMAGE PROCESSING UNIT CAPABILITY | RESOLUTION CONVERSION CAPABILITY VALUE |
|---|---|---|
| NEAREST NEIGHBOR | ○ | 1 |
| BI-LINEAR | ○ | 2 |
| BI-CUBIC | × | 3 |
| HIGH-FREQUENCY 0 INSERTION | × | 4 |

↓ HIGHER CAPABILITY

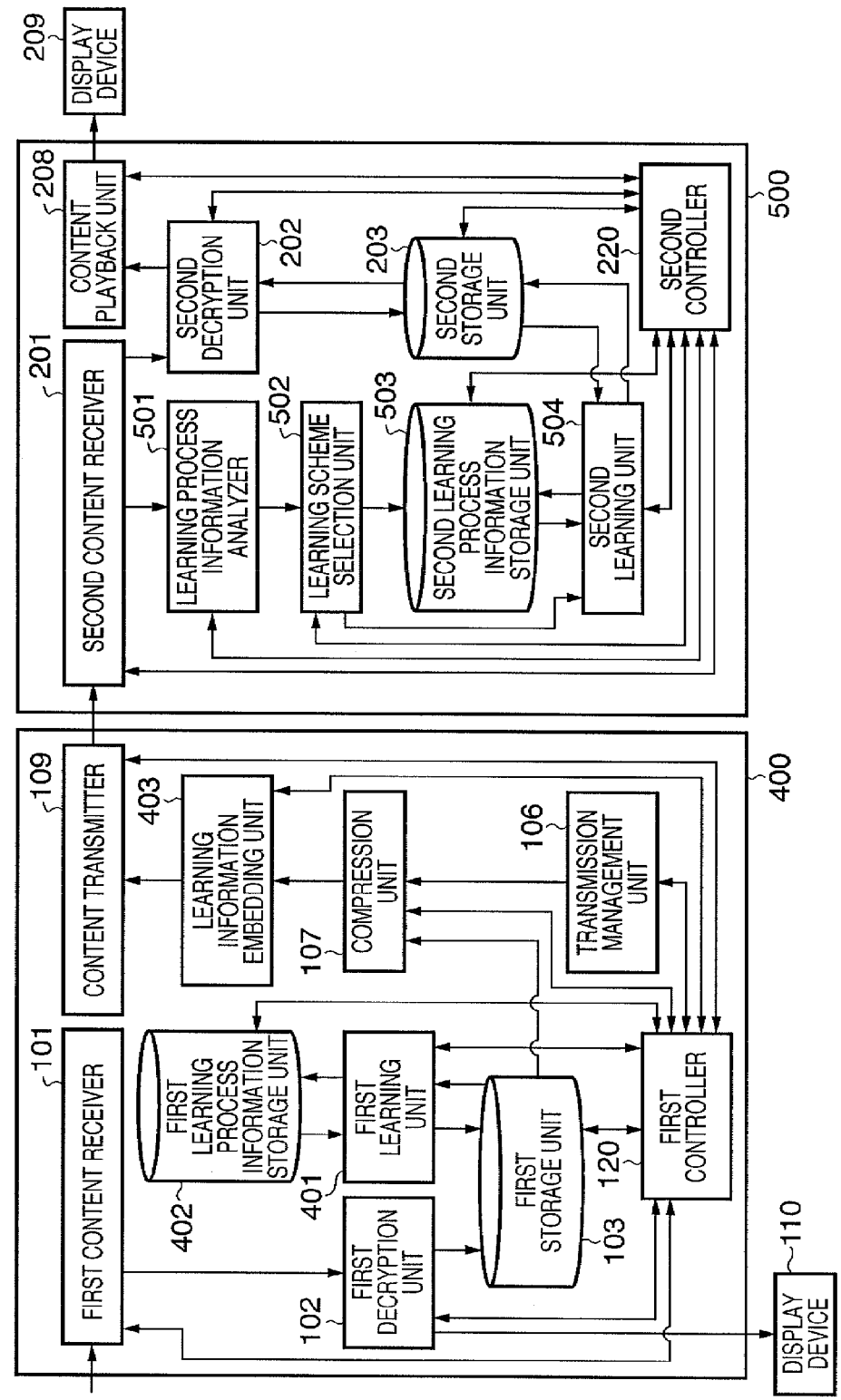

FIG. 10

| 11 | 12 | 13 | 14 | 15 | 16 | 17 | 18 |
|----|----|----|----|----|----|----|----|
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |
| 71 | 72 | 73 | 74 | 75 | 76 | 77 | 78 |
| 81 | 82 | 83 | 84 | 85 | 86 | 87 | 88 |

FIG. 11

| CONTENT NUMBER | LEARNING SCHEME ID | RESOLUTION BEFORE CONVERSION (HORIZONTAL, VERTICAL) | RESOLUTION AFTER CONVERSION (HORIZONTAL, VERTICAL) | RESOLUTION CONVERSION FORMULA PROVISIONAL COEFFICIENTS | COMPUTATIONAL ACCURACY |
|---|---|---|---|---|---|
| 0001 | 1 | (720, 480) | (1920, 1080) | (−1, 1, 3, −5, 3, 3, 2, −1) | 5 |
| 0002 | 1 | (1280, 720) | (1920, 1080) | (−2, −1, 3, 1, 2, 1, 1, 1) | 10 |

FIG. 12

| CONFIGURATION | | |
|---|---|---|
| RTI SECTION | RTIT SECTION HEADER | |
| | RTIT L1 (FIXED) | PROCESSING DEVICE ID | (ID OF FIRST IMAGE PROCESSING APPARATUS) |
| | | LEARNING SCHEME ID | (ID OF BI-CUBIC COEFFICIENT LEARNING) |
| | | PRE-CONVERSION x DIRECTION RESOLUTION INFORMATION | (x-DIRECTION RESOLUTION BEFORE CONVERSION) |
| | | PRE-CONVERSION y DIRECTION RESOLUTION INFORMATION | (y-DIRECTION RESOLUTION BEFORE CONVERSION) |
| | | POST-CONVERSION x DIRECTION RESOLUTION INFORMATION | (x-DIRECTION RESOLUTION AFTER CONVERSION) |
| | | POST-CONVERSION y DIRECTION RESOLUTION INFORMATION | (y-DIRECTION RESOLUTION AFTER CONVERSION) |
| | RTIT L2 (VARIABLE) | CURRENT LEARNING RESULT COEFFICIENT VALUES | (COEFFICIENT VALUES AT CURRENT ACCURACY) |
| | | CURRENT COMPUTATIONAL ACCURACY | (NO. OF TIMES PICK-UP FRAME NUMBER REPEATEDLY EXECUTED) | und
IMAGE PROCESSING APPARATUS AND CONTROL METHOD THEREFOR

BACKGROUND OF THE INVENTION

1. Field of the Invention

The present invention relates to an image processing apparatus and control method therefor that allow unfinished image processing to be transferred.

2. Description of the Related Art

Conventionally, techniques have been proposed for displaying video content obtained from broadcasting and the like, with the video content subjected to an image-quality enhancing process such as improvement of resolution. Such image-quality enhancing process is generally carried out as a real-time process during display.

At the same time, recorders provided with high-capacity storage devices, such as HDD recorders, have recently been spreading, and processor capability provided in the recorders has also been improved. In response to such a background, non-real-time image-quality enhancing processes have also been carried out in which a period of time for which a processor of a recorder has sufficient capability is utilized to enhance the image quality of video content stored in a storage device.

In the case of carrying out a non-real-time image-quality enhancing process, because no one knows when requests to view content to be subjected to the image-quality enhancing process comes about, it is believed to be better to complete the image-quality enhancing process as soon as possible. However, in a case in which a non-real-time image-quality enhancing process is carried out only when a processor load is low, the image-quality enhancing process is not able to be easily completed if the processor capability continues to remain insufficient due to other processes.

For example, it is assumed that a non-real-time image-quality enhancing process is carried out in a television receiver (hereinafter, referred to simply as TV) equipped with a storage device. A processor of the TV is required to continuously carry out processes with large loads, such as creation of a display screen from a data stream received, during viewing of a program. Therefore, the non-real-time image-quality enhancing process is not able to be carried out during viewing of the program, and it is thus difficult to reduce the processing time.

On the other hand, there are known techniques in which, in a case in which multiple image processing apparatuses are connected to each other, the image processing is shared among the apparatuses. In Japanese Patent Laid-Open No. 2004-165814, the image quality is prevented from being degraded in a printing system in which a digital camera that is capable of image processing is connected to a printer, by determining which image processing is carried out by each of the digital camera and the printer for images to be printed so that they both apply the same image processing.

In the prior art described above, it is possible to divide some types of image processing. However, no specific suggestions have been made on processing modes for dividing one particular type of image processing, that is, a processing mode in which an unfinished process carried out by one apparatus is taken over and carried out by another apparatus.

SUMMARY OF THE INVENTION

The present invention is conceived in light of the problems of the conventional art described above.

The present invention provides an image processing apparatus and a control method therefor that, when image processing for stored video content is interrupted, allow another image processing apparatus to take over and carry out the interrupted image processing.

According to one aspect of the present invention, there is provided an image processing apparatus that applies image processing to stored video content, comprising: an image processing unit that applies image processing to the video content; a storage unit that stores image processing information that includes information relating to detail and progress of the image processing; and a transfer unit that, in a case in which the image processing is interrupted, transfers the video content and the image processing information to another image processing apparatus, wherein the transfer unit transfers a content for transfer in which the image processing information is multiplexed with the video content.

According to another aspect of the present invention, there is provided an image processing apparatus having an image processing unit capable of applying image processing to video content, the image processing apparatus comprising: a receiving unit that receives from another image processing apparatus video content and image processing information that includes information relating to detail and status of unfinished image processing carried out by the other image processing apparatus on the video content; and a selection unit that selects image processing to be carried out by the image processing unit based on at least one of information relating to detail and status of the image processing, the image processing unit applying the image processing selected by the selection unit to the video content received from the other image processing apparatus.

According to still another aspect of the present invention, there is provided a control method for an image processing apparatus that applies image processing to stored video content, the control method comprising: an image processing step of applying image processing to the video content with an image processing unit; a storage step of storing in a storage unit image processing information that includes information relating to detail and status of the image processing; and a transfer step of transferring the video content and the image processing information to another image processing apparatus in a case in which the image processing is interrupted, wherein the transfer step transfers a content for transfer in which the image processing information is multiplexed with the video content.

According to yet another aspect of the present invention, there is provided a control method for an image processing apparatus having an image processing unit capable of applying image processing to video content, the cum comprising: a receiving step of receiving from another image processing apparatus video content and image processing information that includes information relating to detail and status of unfinished image processing carried out by the other image processing apparatus on the video content; a selection step of selecting image processing to be carried out by the image processing unit based on at least one of information relating to detail and status of the image processing; and an image processing step of applying the image processing selected in the selection step to the video content received from the other image processing apparatus using the image processing unit.

Further features of the present invention will become apparent from the following description of exemplary embodiments with reference to the attached drawings.

BRIEF DESCRIPTION OF THE DRAWINGS

FIG. 2 is a diagram illustrating an example of image processing information in the first embodiment;

FIG. 3 is a diagram showing an example of correspondence between a resolution conversion process algorithm and ID in the image processing system of the first embodiment;

FIG. 4 is a diagram illustrating an example structure of a section used for multiplexing image processing information in the image processing system of the first embodiment;

FIGS. 6A and 6B are diagrams illustrating examples of resolution conversion algorithms that are able to be carried out by a second image processing unit 207 in a learning process system of a second embodiment;

FIG. 7 is a block diagram illustrating a configuration example of an image processing system according to a third embodiment of the present invention;

FIG. 10 is a diagram for explaining an example of the range of DCT coefficient used as a high-frequency component, in the first learning process unit of the image processing system according to the third embodiment of the present invention;

FIG. 11 is a diagram illustrating an example of learning process information stored in a first learning process information storage unit 402, in the image processing system according to the third embodiment of the present invention;

FIG. 12 is a diagram illustrating an example of a configuration of a section used for multiplexing learning process information in the image processing system of the third embodiment.

DESCRIPTION OF THE EMBODIMENTS

Preferred embodiments of the present invention will now be described in detail in accordance with the accompanying drawings.

First Embodiment

Figure 1:
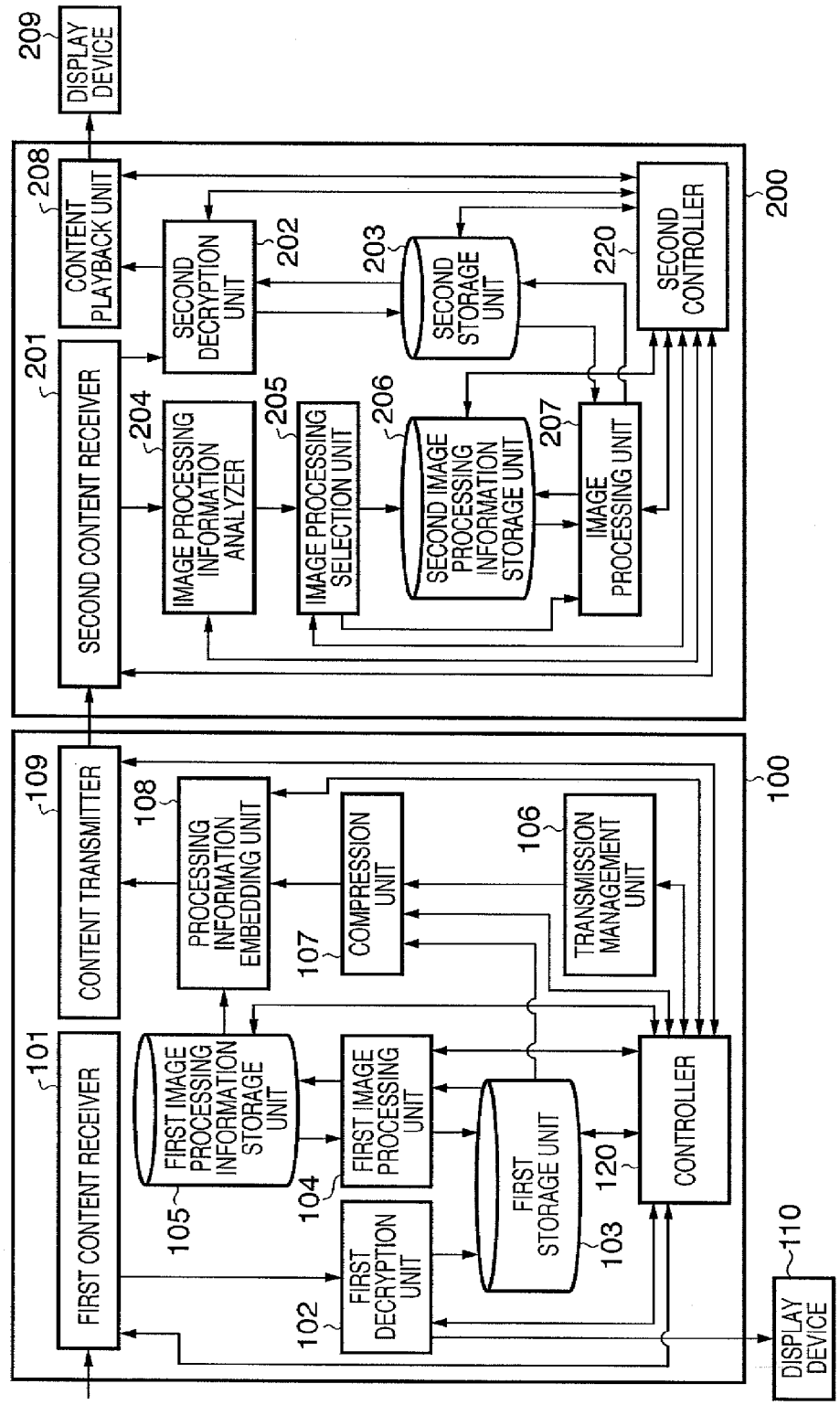
FIG. 1 is a block diagram illustrating a configuration example of an image processing system according to a first embodiment of the present invention.

FIG. 1 is a block diagram illustrating a configuration example of an image processing system according to a first embodiment of the present invention.

In FIG. 1, the image processing system has a configuration in which a first image processing apparatus 100 that has a first display device 110 connected thereto is connected to a second image processing apparatus 200 that has a second display device 209 connected thereto, where image processing that is able to be carried out by the first image processing apparatus 100 is also able to be carried out in the second image processing apparatus 200.

In the first image processing apparatus 100, a first content receiver 101 receives, for example, video content such as digital television broadcasting, a first decryption unit 102 decrypts the video content received by the content receiver 101, and a first storage unit 103 stores the content decrypted by the first decryption unit 102.

A first image processing unit 104 is able to apply image processing such as, for example, a resolution conversion process, a color correction process, a noise reduction process, and a motion detection process, to the video content stored in the first storage unit 103. The first image processing unit 104 again stores the video content, to which the image processing is applied, in the first storage unit 103. In addition, the first image processing unit 104 generates, as image processing information, information relating to the detail (the type of the image processing and the types and values of parameters used) and progress (how much video content has been processed) of the image processing being applied, and stores the information in a first image processing information storage unit 105.

A transmission management unit 106 determines whether or not the processing is to be taken over from the first image processing apparatus 100 by the second image processing apparatus 200. Then, when it is determined that the takeover is required, the transmission management unit 106 directs a compression unit 107 to compress the video content. The compression unit 107 receives the instruction transmitted from the transmission management unit 106, and compresses the video content stored in the first storage unit 103. A processing information embedding unit 108 embeds the image processing information stored in the first image processing information storage unit 105 in the video content compressed by the compression unit 107, and creates transmission content for use in transfer. A content transmitter 109 transmits the transmission content created by the processing information embedding unit 108 to the second image processing apparatus 200. The first display device 110 displays the video content decrypted by the first decryption unit 102.

A first controller 120 controls the operation of the entire first image processing apparatus 110. The first controller 120 is, for example, a processor like a CPU, and achieves the operation of the first image processing apparatus 100 as described below, by reading out a program stored in a ROM, not shown, to a RAM, not shown, and executing the program. The load status of the first controller 120 can be determined as utilization by a scheme generally implemented with software like an activity monitor. In the present embodiment, the first image processing unit 104 monitors the load status of the first controller 120, and initiates non-real-time image processing when the load status is below a predetermined utilization or interrupts the non-real-time image processing when the utilization is equal to or greater than the predetermined value.

It is to be noted that, in FIG. 1, at least some of the respective units except the first storage unit 103 and the image processing information storage unit 105 may be implemented as software by the CPU constituting the first controller 120.

In the second image processing apparatus, a second content receiver 201 receives the transmission content transmitted by the first content transmitter 109. A second decryption unit 202 decrypts the transmission content received by the second content receiver 202, and stores the decrypted transmission content in a second storage unit 203. The second decryption unit 202 further decrypts the video content stored in the second storage unit 203, and outputs the decrypted video content to a content playback unit 208. The second storage unit 203 stores the content decrypted by the second decryption unit 202.

An image processing information analyzer 204 analyzes image processing information included in the transmission content received by the second content receiving portion 201. From the image processing schemes that the second image processing apparatus 200 is capable of processing, and based the analysis result from the image processing information analyzer 204, an image processing selection unit 205 determines whether or not the image processing carried out in the first image processing apparatus 100 is to be continued.

When it is determined that the image processing carried out in the first image processing apparatus 100 is to be continued, the image processing information analyzer 204 determines an image processing scheme to be applied, and stores the image processing scheme together with the analyzed image processing information in a second image processing information storage unit 206.

A second image processing unit 207 uses the image processing scheme and image processing information stored in the second image processing information storage unit 206 to apply image processing to the video content stored in the second storage unit 203. The content playback unit 208 reproduces the video signal decrypted by the second decryption unit 202 or the video content stored in the second storage unit 203. A second display device 209 displays the video content reproduced by the content playback unit 208.

A second controller 220 has the same configuration as the first controller 120, and controls the entire operation of the second image processing apparatus 200.

(Operation)

Next, the operation of the image processing system which has such a configuration will be described.

It is to be noted that an explanation given herein assumes that the image processing of video content to be processed carried out by the first image processing apparatus 100 is an image-quality enhancing process achieved by resolution conversion. However, the type of the image processing is not to be considered limited to such resolution conversion, and other image processing can include, for example, a color correction process, a noise reduction process, and a motion detection (motion vector detection) process.

In addition, as described above, the first image processing apparatus 100 and the second image processing apparatus are able to carry out at least one identical image processing. In a straightforward example, the first image processing apparatus 100 and the second image processing apparatus 200 may be identical apparatuses. Alternatively, the image processing apparatuses may each ascertain the detail of image processing that the other is able to process, so that the first image processing apparatus 100 takes over only image processing that is able to be processed by the second image processing apparatus 200. This mutual grasp of the other apparatus's abilities can be achieved by exchanging ability information with each other or the like in a handshaking procedure carried out for establishing communication between the first image processing apparatus 100 and the second image processing apparatus 200.

In the present embodiment, the first image processing unit 104 subjects the video content stored in the first storage unit 103 to resolution conversion (resolution enhancement) for each frame constituting the video content, using a bi-cubic algorithm that is a common resolution conversion scheme. This resolution conversion process is carried out as non-real-time processing when the load status of the first controller 120 is low (the utilization is low).

For example, assume that the load of the processor in the first image processing apparatus 100 is increased, for example, the utilization exceeds a predetermined threshold value, due to some sort of user's request at the timing of the completion of a resolution conversion process carried out from the first to n-th frames. In the present embodiment, with this status as a trigger, the processing is taken over from the first image processing apparatus 100 by the second image processing apparatus 200 so that the resolution conversion process can be continued from the n+1-th frame of the video content in the second image processing apparatus 200.

Video content input from an external apparatus, not shown, is received by the first content receiver 101 in the first image processing unit 100. In the present embodiment, video content is input in TS (Transport Stream) format of MPEG2 (Moving Picture Expert Group 2). Therefore, the first content receiver 101 receives MPEG2-TS data, extracts video content desired by a user from multiple multiplexed pieces of video content, and outputs the extracted video content to the first decryption unit 102. It is to be noted that although the first content receiver 101 extracts and controls synchronization of audio together with video content, description of the extraction or synchronization of audio is not directly related to the embodiment, and will be thus omitted.

The first decryption unit 102 decrypts compressed moving images input from the first content receiver 101. In the present embodiment, it is contemplated that the compressed moving images are MPEG2-Video. Thus, the first decryption unit 102 executes MPEG2 format decryption and stores the decrypted moving images in the first storage unit 103 for each frame.

The first image processing unit 104 reads out the moving images stored in the first storage unit 103 for each frame, executes a resolution conversion process, and again stores the moving images in the first storage unit 103. In the present embodiment, a bi-cubic algorithm is used to convert (increase) the resolution of an input frame to a resolution specified by a user.

It is to be noted that the first image processing unit 104 stores, in the first image processing information storage unit 105, image processing information required for executing the same resolution conversion process in the second image processing apparatus. Image processing information in the present embodiment includes information relating to the detail and progress of image processing, such as an ID value indicating the type of algorithm for resolution conversion, an already processed frame number, the resolution before resolution conversion, and the resolution after resolution conversion. Therefore, the detail of processing information can vary depending on the type of image processing.

The first image processing apparatus 100 sequentially reads out the frames of moving images to be processed from the first storage unit 103 and continues the resolution conversion process, as long as the utilization indicating the load status of the first controller 120 is below a predetermined threshold value.

For example, assume that video content which is different from video content to be subjected to resolution conversion, for example, a request for viewing of an on-air program, is input from a user, for example, with a remote control or the like. In this case, the first controller 120 functioning as the first content receiver 101 and the first decryption unit 102 has a processing load increased. Then, as a result, when the utilization of the first controller 120 exceeds a predetermined threshold value, the first image processing unit 104 immediately interrupts the resolution conversion process. Then, the first image processing unit 104 stores the image processing information at the time of interruption in the first image processing information storage unit 105, and stores the video content to be subjected to the processing in association with information identifying the video content to be processed.

Further, the transmission management unit 106 determines whether or not the image processing should be taken over by the second image processing unit. The criteria or conditions for such determination by the transmission management unit 106 is not particularly limited, and it may be simply determined that the takeover should be unconditionally executed when the image processing in the first image processing apparatus is interrupted.

Alternatively, it is also possible to obtain the processing load of the second image processing apparatus by query or the like via a communication interface, not shown, and determine that the processing should be taken over when the processing load of the second image processing apparatus is low and the image processing is thus considered able to be immediately carried out continuously.

The transmission management unit 106 does nothing particularly in a case in which it is determined that the image processing should not be taken over. Alternatively, the transmission management unit 106 may regularly monitor the processing load of the second image processing apparatus.

When it is determined that the image processing should be taken over, the transmission management unit 106 directs the compression unit 107 to compress video content, for which the image processing is interrupted by the first image processing unit 104, using a moving image compression scheme. Although the compression scheme is not limited, compression is carried out in the MPEG2 format in the present embodiment.

The compression unit 107 receives the instruction from the transmission management unit 106, reads out and compresses the video content stored in the first storage unit 103 for which resolution conversion is interrupted, and outputs the compressed video content to the processing information embedding unit 108.

The processing information embedding unit 108 reads out the image processing information of the video content from the first image processing information storage unit 105, and embeds the image processing information in the video content compressed by the compression unit 107 to create transmission content.

Although the data format is arbitrary when the transmission content is transferred from the first image processing apparatus 100 to the second image processing apparatus 200, the MPEG2-TS format is used in the present embodiment. A method for embedding image processing information in MPEG2-TS will be described in detail below.

The content transmitter 109 transfers the transmission content created by the processing information embedding unit 108 to the second image processing apparatus 200.

Next, the operations of the first image processing unit 104 and first image processing information storage unit 105 will be described in detail.

The first image processing unit 104 executes a resolution conversion process sequentially from a frame displayed early in terms of time among frames constituting moving images included in the video content. The converted resolution may have a value, for example, set for the first image processing apparatus by a user.

Then, the first image processing unit 104 records and revises, as image processing information in the first image processing information storage unit 105, information required for continuously executing the resolution conversion process in the process of being executed in the second image processing apparatus.

Specifically, the image processing information includes information relating to the detail and progress of the image processing. As in FIG. 2 which shows an example of the image processing information, for example, the "content identification number", "ID indicating resolution conversion algorithm", the "already processed frame number", the "resolution before resolution conversion", and the "resolution after resolution conversion" are stored in the first image processing information storage unit 105.

The "content identification number" is a number for identifying content stored in the first storage unit 103. In the present embodiment, serial numbers are assigned in the order of input from the first decryption unit 102 to the first storage unit 103.

The "name of resolution conversion algorithm" is information for specifying the scheme (algorithm) used for the resolution conversion process. In the present embodiment, the first image processing apparatus 100 and the second image processing apparatus 200 store IDs that are able to be distinguished. FIG. 3 is a diagram showing an example of correspondence between algorithm and ID in the resolution conversion process. The "bi-cubic algorithm" is used in the present embodiment, and therefore the corresponding ID=3 is stored in the image processing information.

The "completed frame number" is, as information relating to the progress, the number of the frame already processed by the first image processing unit 104, and revised, for example, every time processing for one frame is completed.

The "resolution before resolution conversion" and the "resolution after resolution conversion" store the numbers of pixels in the X direction and Y direction of moving images before resolution conversion in the first image processing apparatus 100 and the numbers of pixels in the X direction and Y direction of the moving images after the resolution conversion, respectively.

It is only necessary to record these items once, except for the completed frame number, while it is necessary to revise the completed frame number with the progress of the processing.

It is to be noted that although the a case of the image processing including only the resolution conversion process is described herein for convenience of explanation and understanding, various types of image processing can be applied in practice as described above. Therefore, in practice, the image processing information also includes ID for specifying the type of image processing, and ID for specifying the scheme (algorithm), parameter values, and the like will be stored for each type of image processing.

Next, the operation of the processing information embedding unit 108 will be described in detail.

As described above, the processing information embedding unit 108 multiplexes image processing information stored in the first image processing information storage unit 105 in the creation of transmission content in the MPEG2-TS format. At this time, the processing information embedding unit 108 defines and multiplexes the image processing information as a new MPEG2-TS section that can be analyzed by both the first image processing apparatus 100 and the second image processing apparatus 200. In the present embodiment, RTIT (Resolution Translate Information Table) is newly defined as a table for transmitting image processing information, which here is resolution conversion information.

FIG. 4 shows an example RTIT structure. Description of a section header added to a common MPEG2-TS section will be omitted, but information included in the payload of the section will be described.

As shown in FIG. 4, values according to each item of the image processing information are stored in the RTIT, where processing device ID includes any identification information for specifying the first image processing apparatus 100. The "resolution conversion algorithm ID", the "resolution before resolution conversion", and the "resolution after resolution conversion" each includes values corresponding to the image processing information. It is to be noted that although the example of FIG. 4 takes the form in which the resolution is represented for each of the X direction and Y direction, the resolution may be represented all together for the X direction and Y direction as shown in FIG. 2.

The image processing other than the resolution conversion is also defined as a new section in a similar way, and information according to the image processing is put in the payload in the section.

When the second image processing apparatus 200 receives the transmission content from the first image processing apparatus 100, the multiplexed information of MPEG2-TS is first analyzed (demultiplexed) in the second content receiver 201. The second content receiver 201 outputs the compressed moving images of the multiplexed information and the image processing information thereof multiplexed as RTIT to the second decryption unit 202 and the image processing information analyzer 204, respectively.

The second decryption unit 202 decrypts the compressed moving images input from the first content receiver 201, and stores the decrypted moving images in the second storage unit 203 for each frame.

The image processing information analyzer 204 analyzes the image processing information, acquires each item included the RTIT payload shown in FIG. 4, and transmits the items to the image processing selection unit 205. As described above, the detail of the specific information included in the image processing information varies depending on the image processing.

The image processing selection unit 205 specifies the image processing carried out in the first image processing apparatus 100 based on the image processing information input from the image processing information analyzer 204. Then, the image processing information is recorded in the second image processing information storage unit 206 as image processing information used by the second image processing unit 207 so that the second image processing unit 207 can continue the image processing carried out in the first image processing apparatus. The image processing information stored in the second image processing information storage unit 206 is equivalent to the image processing information (FIG. 2) stored in the first image processing information storage unit 105, and as the content number, a number is assigned which is different from the number for the video content already stored in the second storage unit 203.

The second image processing unit 207 checks the details stored in the second storage unit 203 and the second image processing information storage unit 206 periodically, and checks whether or not content to be processed is registered. It is to be noted that the image processing selection unit 205 may notify the second image processing unit 207 that a new process to be continued is registered.

When moving images are transmitted from the first image processing apparatus to the second image processing apparatus, information as in FIG. 2 is written in the second image processing information storage unit 206 by the image processing selection unit 205. Accordingly, the process to be continued, the process initiation frame, and the resolution conversion size can be specified from the resolution conversion algorithm ID, the completed frame number, and the resolutions before and after conversion, respectively.

In this way, the detail of the image processing to be continued can be specified, while the video content to be processed can be specified from the content number. Then, the frames constituting the moving images of the video content to be processed are read out from the second storage unit 203 for each frame from the frame after the completed frame number.

Then, the second image processing unit 207 executes the image processing specified by the image processing information stored in the second image processing information storage unit 206, and stores the result of the image processing in the second storage unit 203 for each frame. In addition, the second image processing unit 207 revises the completed frame number of the image processing information. The operation of the second image processing unit 207 is the same as that of the first image processing unit 104.

As describe above, according to the present embodiment, the first image processing apparatus 100 transmits the image processing information required for continuously carrying out the interrupted image processing and the partway processed video content to the second image processing apparatus 200, thereby allowing the image processing for the received video content to be continued using the image processing information in the second image processing apparatus 200.

Therefore, advantageously, even when the processing load of the first image processing apparatus continues to remain large, carrying out the image processing for video content in another image processing apparatus allows the time required for the completion of the image processing to be reduced.

It is to be noted that when the increase in the processing load of the second image processing apparatus forces the image processing being continued to be interrupted, it is also possible for the first image processing apparatus 100 to again take over the image processing from the second image processing apparatus 200. In this case, a process may be carried out in the second image processing apparatus 200 similar to the process carried out when the processing is taken over from the first image processing apparatus 100 by the second image processing apparatus 200. Specifically, video content obtained by multiplexing the image processing information may be transferred to the first content receiver 101, using a transmission management unit, a compression unit, a processing information embedding unit, and a content transmitter of the second image processing apparatus 200, which are not shown in the figures.

In addition, also when the image processing for video content is entirely completed as a result of the continuous processing carried out in the second image processing apparatus 200, transfer to the first image processing apparatus 100 can be carried out in a similar way. Thus, the first image processing apparatus 100 can determine the completion of the processing for all of the frames from the completed frame number, based on the image processing information. Therefore, the received video content can be stored in the first storage unit 103 as processed video content, and in a case in which one subsequently requests viewing of the video content, display processing can be carried out using the processed video content.

Second Embodiment

An image processing system according to a second embodiment of the present invention will be described below.

The image processing system according to the present embodiment may be equivalent to the image processing system according to the first embodiment, except for the operation of the image processing selection unit in the second image processing apparatus. Therefore, description of its configuration will be omitted.

In the first embodiment, the second image processing apparatus 200 has the ability to carry out image processing that is equivalent to the ability of the first image processing apparatus 100. However, in practice, it is also contemplated that the second image processing apparatus 200 does not have the same processing ability as that of the first image processing apparatus 100. Such a situation can arise when, for example, the second image processing apparatus 200 is an apparatus that has a lower image processing ability than the first image processing apparatus 100.

In the present embodiment, when the second image processing apparatus takes over image processing from the first image processing apparatus and executes the image processing, the second image processing apparatus executes the processing even if it is not possible to execute the same image processing as that executed by the first image processing apparatus.

Also in the present embodiment, it is assumed that, in the same way as in the first embodiment, a resolution conversion process according to the bi-cubic algorithm is interrupted, which is being carried out in the first image processing apparatus 100 as non-real-time image processing, and this processing is to be continued in the second image processing apparatus 200. Accordingly, the description of the process up to the transfer of data in the MPEG-TS format, obtained by multiplexing video content partway processed by the first image processing apparatus 100 and image processing information, will be omitted, and processing in the image processing selection unit 205 of the second image processing apparatus 200 will be described.

The image processing selection unit 205 receives, through the image processing information analyzer 204, the image processing information received from the first image processing apparatus 100.

As described above, the image processing includes information indicating that "resolution conversion according to a bi-cubic algorithm" is carried out "up to the frame number n", "from the resolution before resolution conversion" "to the resolution after resolution conversion".

The image processing selection unit 205 holds information relating to which is superior, a common image processing algorithm or an image processing algorithm that can be executed by the second image processing unit 207. Then, the image processing selection unit 205 compares the held information with the detail of the image processing carried out by the first image processing apparatus 100, and determines the detail of the image processing to be carried out by the second image processing unit 207.

Figure 5:
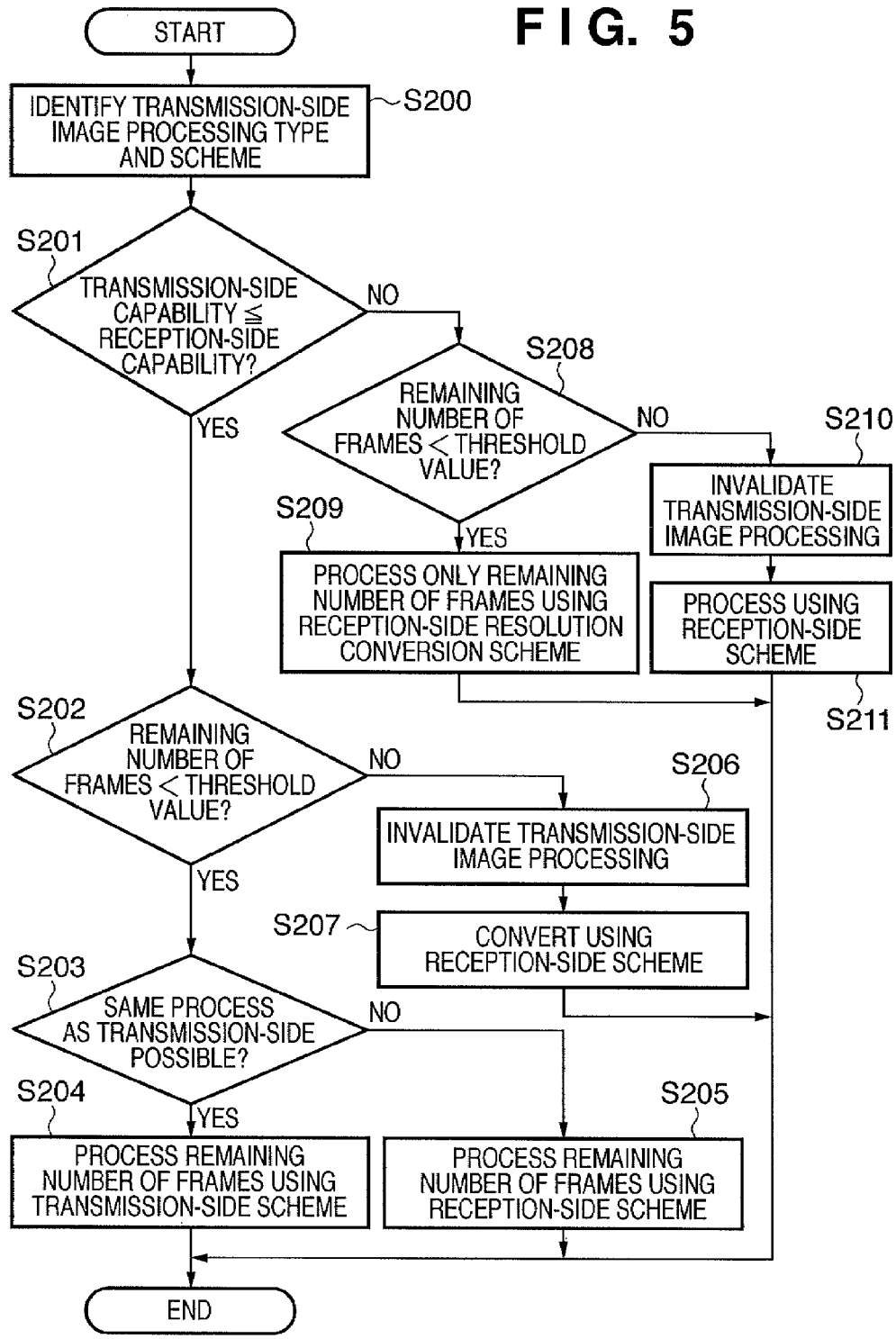
FIG. 5 is a flowchart for explaining the operation of an image processing selection unit 205 in the image processing system of the first embodiment.

FIG. 5 is a flowchart for explaining the operation of the image processing selection unit 205 in the present embodiment.

First, the image processing selection unit 205, when image processing information is input, obtains information relating to the type of image processing (the resolution conversion process in the present embodiment) and the algorithm (bi-cubic algorithm) (S200). Then, the second image processing unit 207 determines whether or not an algorithm which has a higher ability (from which more favorable results can be obtained) than the algorithm executed by the first image processing apparatus 100 can be executed (S201). When as a result of the determination the second image processing unit 207 is able to execute the image processing algorithm from which more favorable results can be obtained than the image processing carried out by the first image processing apparatus 100, the image processing selection unit 205 checks whether or not the number of unprocessed frames (remaining frames) is at or above a predetermined threshold value (S202). More specifically, the image processing selection unit 205 checks the ratio of a portion which has not been subjected to image processing in the first image processing apparatus.

When the number of remaining frames is less then the threshold value, the image processing selection unit 205 gives priority to early completion of the resolution conversion process rather than image quality, and subjects only the remaining frames to resolution conversion in the second image processing apparatus 200. The image processing selection unit 205 determines whether or not the second image processing unit 207 is able to carry out the same resolution conversion process as that carried out by the first image processing apparatus 100 (S203). Then, when the same resolution conversion process as that carried out by the first image processing apparatus 100 is able to be carried out, as is done by the image processing selection unit 205 in the first embodiment, the image processing selection unit 205 stores the image processing information in the second image processing information storage unit 206 and notifies the second image processing unit 207. Then, the second image processing unit 207 initiates processing for the remaining frames in the same way as in the first embodiment (S204).

By contrast, in S203, in a case in which the second image processing unit 207 is not able to carry out the same resolution conversion as that carried out by the first image processing apparatus 100, the image processing selection unit 205 determines a algorithm from which the closest processing result can be obtained from algorithms that are able to be carried out by the second image processing unit 207. Then, the image processing selection unit 205 stores the image processing information with the ID of the resolution conversion algorithm changed in the second image processing information storage unit 206, and notifies the second image processing unit 207. By doing so, the second image processing unit 207 initiates processing for the remaining frames in the same way as in the first embodiment (S205). However, in this case, the algorithm used is different from that executed by the first image processing apparatus 100.

In S202, when the number of remaining frames is more than the threshold value, the image processing selection unit 205 gives priority to the quality of the processing (improvement in image quality) rather than the time to the completion of the image processing (resolution conversion).

In this case, the image processing selection unit 205 invalidates the image processing carried out on the video content by the first image processing apparatus 100, and notifies the second image processing unit 207 such that image processing which is able to be executed by the second image processing unit 207 and from which more favorable results can be obtained is carried out from the beginning.

In this case, the image processing information stored in the second image processing information storage unit 206 by the image processing selection unit 205 may be the same as in the first embodiment. However, in response to notification of the carrying out of a redoing of the image processing, the second image processing unit 207 first executes an invalidation process based on the image processing information, in response to the notification of redoing (S206). Specifically, the second image processing unit 207, for example, executes processing for reduction to the resolution before resolution conversion for each frame from the first to the completed frame number, so that the resolution conversion process carried out by the first image processing apparatus 100 can be invalidated.

Then, among image processing algorithms that are able to be executed by the second image processing unit 207, a algorithm from which more favorable results can be obtained than the algorithm executed by the first image processing apparatus 100 is used to carry out image processing, starting from the frame subjected to the invalidation process (S207).

As an example, assume that the second image processing unit 207 is able to execute a resolution conversion algorithm shown in FIG. 6A. In this case, a high-frequency region 0 insertion algorithm is executed from which more preferable results can be obtained than from the bi-cubic algorithm executed by the first image processing apparatus 100.

As another example, as shown in FIG. 6B, assume that the second image processing unit 207 is able to execute only a bi-linear algorithm and a nearest neighbor algorithm from which results are obtained that are inferior to those obtained from the bi-cubic algorithm executed by the first image processing apparatus 100. In this case, in S205, the second image processing unit 207 executes a resolution conversion process according to a bi-linear algorithm from which the closest result can be obtained to the result obtained with the bi-cubic algorithm executed by the first image processing apparatus 100.

In S201, when it is determined that the second image processing unit 207 is able to execute only image processing algorithms which have lower abilities than the algorithm executed by the first image processing apparatus 100, the image processing selection unit 205 determines whether or not the number of remaining frames is at or above the threshold value in the same way as in S202.

When the number of remaining frames is less than the threshold value, the image processing selection unit 205 gives priority to earlier completion of the resolution conversion process rather than the image quality, and subjects only the remaining frames to resolution conversion using an algorithm from which the best result can be obtained among algorithms that can be executed by the second image processing unit 207. In this case, the image processing selection unit 205 rewrites the ID of the resolution conversion algorithm of the image processing information stored in the second image processing information storage unit 206 to an ID corresponding to the algorithm from which the best result can be obtained of those algorithms that can be executed by the second image processing unit 207. Then, the image processing selection unit 205 notifies the second image processing unit 207 of the continuation of the processing.

The second image processing unit 207 executes, in response to this notification, the resolution conversion process according to the bi-linear algorithm sequentially from the frame after the completed frame number (S209).

By contrast, in S208, when the number of remaining frames is at or above the threshold value, the image processing selection unit 205 gives priority to overall image quality uniformity rather than incomplete high image quality. More specifically, the image processing selection unit 205 invalidates the processing carried out by the first image processing apparatus 100 (S210) in the same way as in S206 and S207, and starts image processing again from the beginning, using a algorithm which can be executed by the second image processing unit 207 and from which the most favorable result can be obtained (S211).

However, unlike the case of S207, lower quality results are obtained in S211 than in the image processing carried out by the first image processing apparatus 100. More specifically, in the example of FIG. 6B, the resolution conversion process according to the bi-linear algorithm is carried out from the beginning in S211.

As described above, in the present embodiment, the image processing apparatus which takes over the process changes the detail of image processing to be taken over and carried out, depending on:
   how much video content to be processed has been processed already; and
   the relation between the image processing carried out by the image processing apparatus which transfers the process and the image processing which can be taken over and executed.

Therefore, it is possible to take over the process appropriately depending on the progress of the process at the time of transfer of the process.

Third Embodiment

An image processing system according to a third embodiment of the present invention will be described below.

FIG. 7 is a block diagram illustrating a configuration example of the image processing system according to the present embodiment. In FIG. 7, the same reference numerals are assigned to the same operational blocks as those of the image processing system according to the first embodiment, and description thereof will be omitted.

In FIG. 7, the image processing system has a configuration in which a first image processing apparatus 400 that has a first display device 110 connected thereto is connected to a second image processing apparatus 500 that has a second display device 209 connected thereto.

In the first image processing device 400, a first learning unit 401 analyzes (image processes) each frame of video content stored in a first storage unit 103, and learns coefficients of a resolution conversion calculation equation, with which resolution conversion can be executed with the most high-frequency component retained. The coefficients of this computation equation are referred to as simply parameters below. A first learning process information storage unit 402 stores parameters being learned by the first learning unit 401. A learning information embedding unit 403 embeds learning process information stored in the first learning process information storage unit 402 in compressed moving images created by a compression unit 107. This embedding is carried out when a transmission management unit 106 determines that it is necessary to transfer video content from the first image processing unit 400 to the second image processing unit 500.

In the second image processing unit 500, a learning information analyzer 501 analyzes learning information included in content input from the first image processing apparatus 400. A leaning scheme selection unit 502, based on learning schemes that are able to be executed by a second learning unit 504, determines whether or not the detail learned by the first image processing apparatus 400 and analyzed by the learning information analyzer 501 is to be continued, and determines a learning scheme to be executed by the second learning unit 504. The learning scheme selection unit 502 further stores, in a second learning process information storage unit 503, the determined learning scheme and the processing information learned in the first image processing apparatus 400. The second learning process information storage unit 503 holds the learning process information from the second learning unit 504. The second learning unit 504 analyzes each frame of video content stored in a second storage unit 203, and learns parameters for resolution conversion.

The present embodiment is intended to, in the first image processing apparatus 400, analyze frames read from video content stored in the first storage unit 103, and learn a calculation equation for resolution conversion which is similar to bi-cubic and capable of retaining the most high-frequency component. Then, when all the frames of the video content are analyzed and learning is completed, the resolution conversion equation for resolution conversion of the video content to be subjected to processing is determined. Then, the determined equation is used to execute resolution conversion of the video content to be subjected to processing.

At this time, the number of frames used for learning the resolution conversion calculation equation is managed as learning accuracy. It is then assumed that the learning process of the resolution conversion calculation equation in execution as non-real-time image processing is interrupted at the timing of the learning accuracy n.

The cause for this interruption may be any process which increases the processing load of a first controller to or above a threshold value as in the first and second embodiments. When the utilization of the first controller 120 of the first image processing apparatus 400 exceeds the threshold value to run out of computing capability, the first learning process unit interrupts the learning process.

The transmission management unit 106 determines whether or not the learning process should be taken over by the second image processing apparatus 500. Then, in a case in which it is determined that the learning process from the first image processing apparatus 400 is to be continued in the second image processing apparatus 500, video contend obtained by multiplexing the learning process information is transferred to the second image processing apparatus 500 instead of the image processing information in the first and second embodiments. In the second image processing apparatus 500, the learning process is continued from the learning accuracy n+1.

As described above, the processing in the present embodiment fundamentally has the same flow as that of the first embodiment, except that the "resolution conversion process" in the first embodiment is replaced by the "learning process of the resolution conversion equation", and thus description thereof will be thus omitted. Description will be omitted of details of the operation.

The operation of the first learning unit 401 will be described.

A common bi-cubic calculation equation will be described with reference to FIG. 8.

Figure 8:
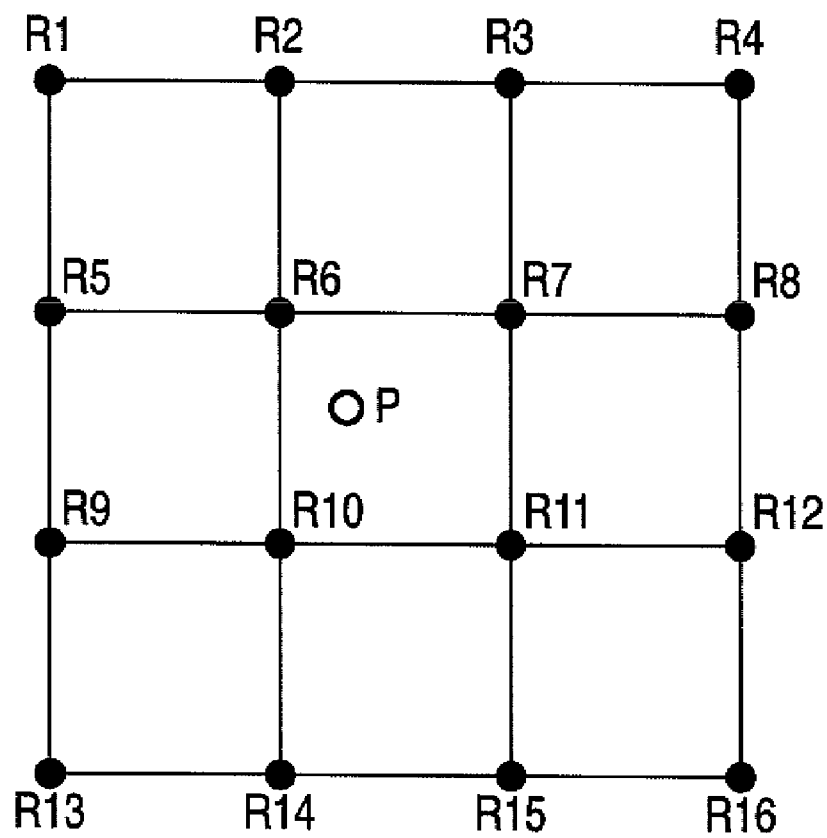
FIG. 8 is a diagram for explaining a bi-cubic algorithm.

When a pixel that is complemented as a result of resolution conversion is denoted by a pixel P, the calculation equation for calculating the pixel value of P is expressed by the sum of values R1 to R16 of 16 neighboring pixels surrounding the pixel P in FIG. 8, with the values R1 to R16 weighted by weighting coefficients W1 to W16, that is:

$$P = \sum_{n=1}^{16} Wn * Rn \quad (1)$$

Where the weighting coefficients W1 to W16 are proportional to the distances d from the position of the pixel P to the reference neighboring pixels Rn ($1 \leq n \leq 16$), the following applies generally:

$d^3 - 2d^2 + 1$ (if $d < 1$)

$-d^3 + 5d^2 - 8d + 4$ (if $1 < d < 2$) \quad (2)

In the present embodiment, the calculation equation (2) is changed as follows by learning.

$Ad^3 + Bd^2 + Cd + D$ (if $d < 1$)

$Ed^3 + Fd^2 + Gd + H$ (if $1 < d < 2$) \quad (3)

Then, coefficients A to H of the equation (3) are obtained by learning.

Figure 9:
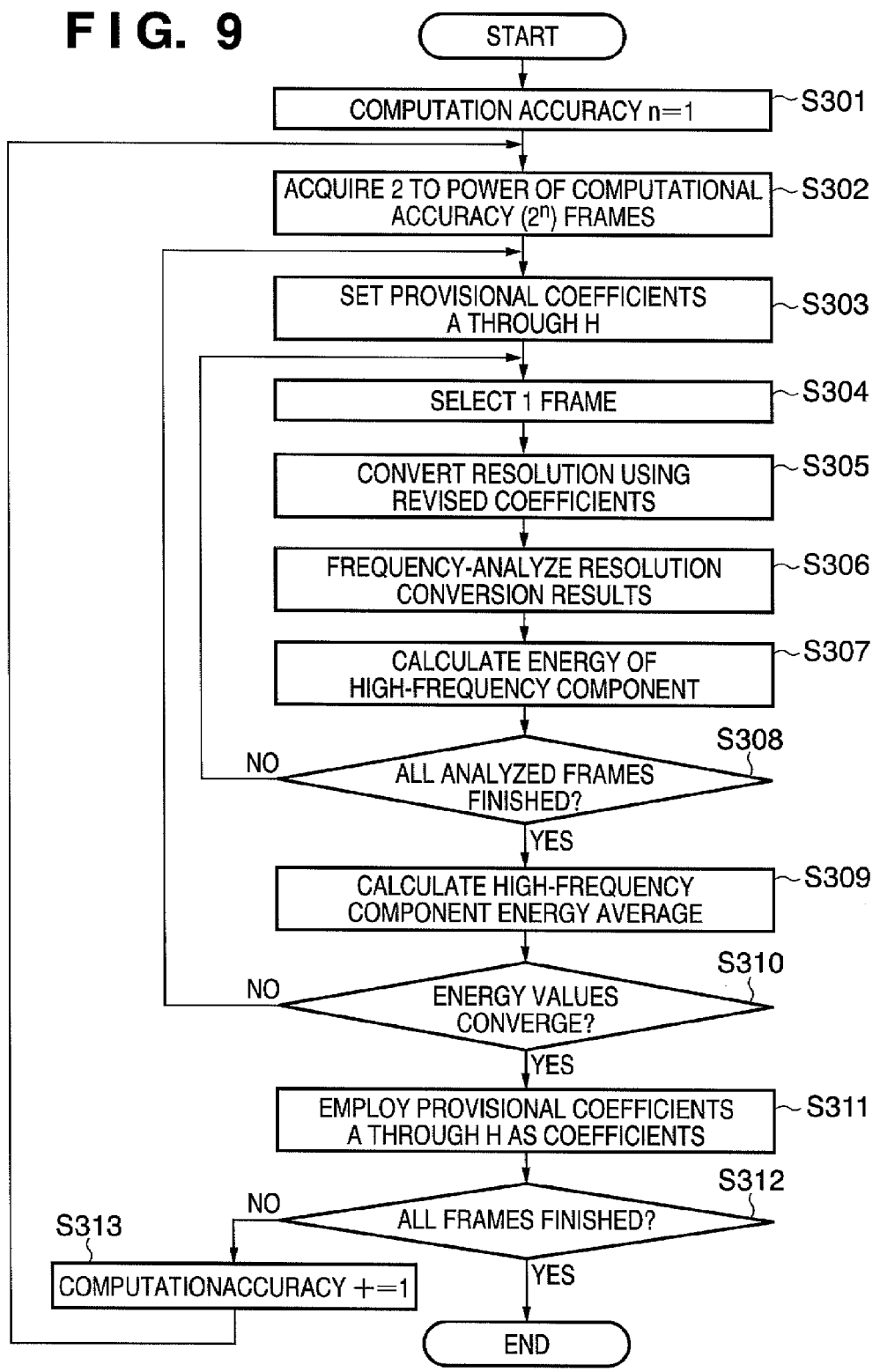
FIG. 9 is a flowchart for explaining an example of a method for learning the coefficient of a resolution conversion equation, carried out by a first learning process unit of the image processing system according to the third embodiment of the present invention.

The learning scheme will be described in detail with reference to FIG. 9.

First, the first learning unit 401 sets the calculation accuracy to 1 (S301). The calculation accuracy is a numerical value of video content which determines the amount of the number of frames to be used for learning. Therefore, a larger value of the calculation accuracy means a coefficient determined based on more frames (=higher accuracy).

The calculation accuracy is progressively revised, and the number of frames to be used for calculation at the calculation accuracy is set to 2 to power of computational accuracy ($2^n$), and selected at determined intervals (S302). Next, the respective coefficient A to H of the equation (3) are arbitrarily set (S303), and one of the selected frames is subjected to resolution conversion using the equation with the set coefficients applied (S304, S305).

Next, the resolution conversion results are analyzed into spatial-frequency components in accordance with a scheme such as DCT (Discrete Cosine Transform) (S306) Further, the energy of a high-frequency component is calculated and added for the analyzed frequency components (S307) The high-frequency component herein indicates a DCT coefficient in a region such as a gray portion in FIG. 10, for example, in a case in which DCT is executed in 8×8, and the energy of the high-frequency component is a square value of each DCT coefficient.

This processing is executed for all of the frames extracted in S302 (S308) After the processing is completed for all of the frames extracted in S302, the average energy value for the analyzed frames is calculated (S309).

The provisional coefficients A though H for the maximum high-frequency component energy are repeated by any optimization scheme (for example, a steepest descent method) until the energy values converge (S310). Once the high-frequency component energy values converge, the current provisional frequencies are employed as resolution conversion coefficients at the current computational accuracy (S311). Further, in a case in which learning with all of the frames has not been carried out, computation is repeated with the computational accuracy incremented by +1 (S312, S313).

FIG. 11 shows an example of learning process information stored by the first learning unit 401 in the learning process information storage unit 402 in the course of carrying out such learning.

A content number is a value which specifies video content corresponding to learning process information from video content stored in the first storage unit 103. A learning scheme ID value is a value which indicates a learning scheme predetermined between the first image processing apparatus and the second image processing apparatus. A resolution before resolution conversion and a resolution after resolution conversion are the same as defined in the first embodiment. Further, FIG. 11 includes the values of provisional coefficients A to H of a resolution conversion equation obtained by most recent calculation and corresponding computational accuracies.

In the same way as in the first embodiment, the learning process information is multiplexed by the learning information embedding unit 403 with information compressed by the compression unit 107 and transmitted. The multiplexing method may be the same as in the first embodiment, and the learning process information included in RTIT defined as a new section in the MPEG2-TS format is multiplexed with video content.

FIG. 12 shows a configuration example of a section in the MPEG2-TS newly defined in the present embodiment.

In the present embodiment, there are multiple learning scheme ID, and in order to deal with cases in which information to be transmitted varies depending on the learning scheme the section is defined to include a fixed portion 320 and a variable portion 321.

Fixed information that does not vary regardless of the learning scheme, such as resolutions before and after conversion, is stored in the fixed portion 320. Information dependent on learning schemes is stored in the variable portion 321. The learning process information in the present embodiment includes items shown in FIG. 11. Thus, the learning scheme ID and the resolutions before and after conversion are stored in the fixed portion 320, while the provisional coefficient values and computational accuracies are stored in the variable portion 321.

When transmission video content of the learning process information and video content multiplexed in the MPEG2-TS format is transferred from the content transmitter 109 to the second image processing apparatus 500, a second content receiver 201 carries out multiplex separation. The second content receiver 201 provides the video content and the learning process information to a second decryption unit 202 and the learning information analyzer 501.

The learning information analyzer 501 extracts the detail of the learning carried out in the first image processing apparatus 400 from the learning process information provided, and notifies a learning scheme selection unit 502 of the detail.

Figure 13:
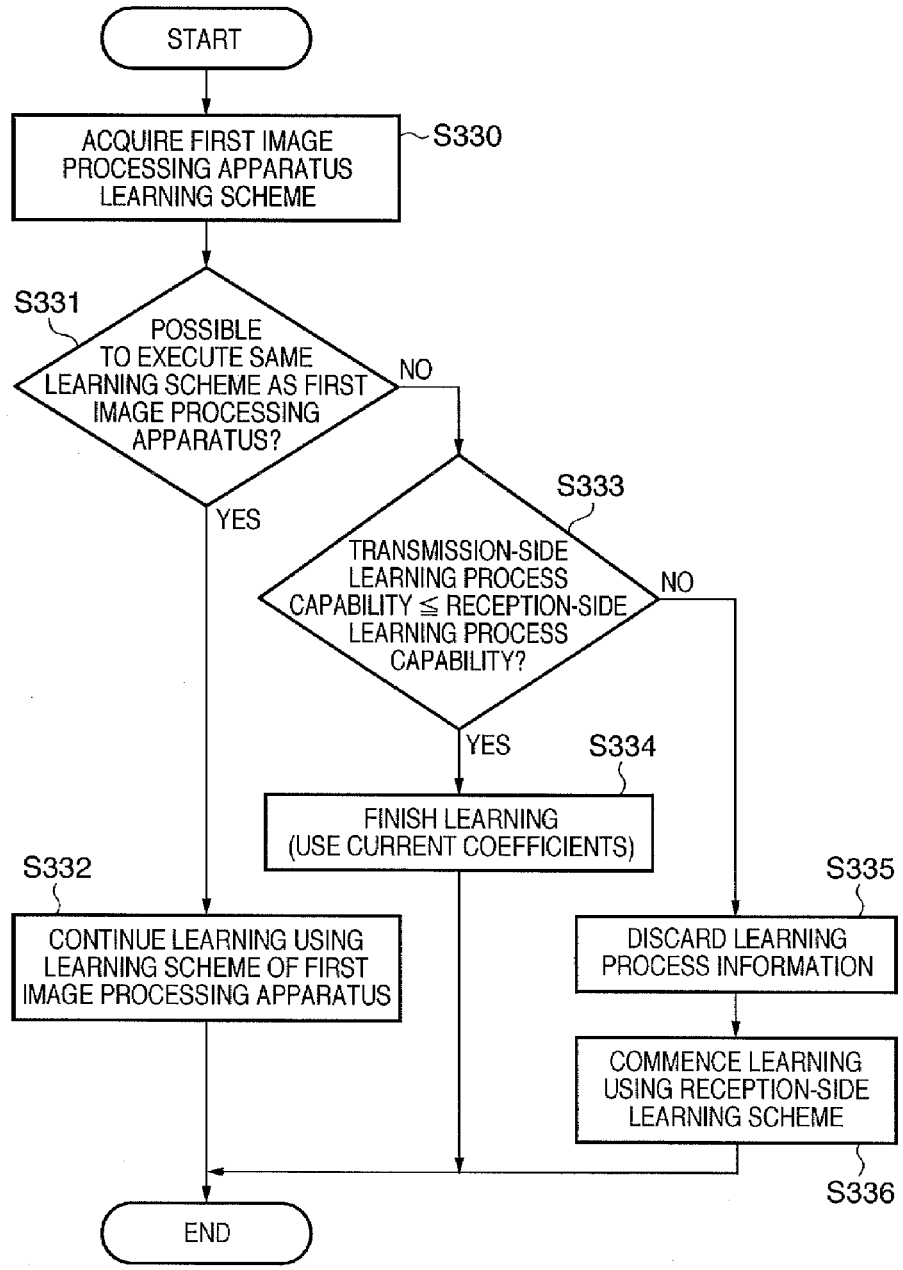
FIG. 13 is a flowchart for explaining the operation of a learning scheme selection unit 502 in the image processing system of the third embodiment.

The operation of the learning scheme selection unit 502 will be described in detail with reference to a flowchart shown in FIG. 13.

First, the learning scheme selection unit 502 checks whether or not the second learning unit 504 is able to execute the same learning scheme as the learning scheme executed in the first image processing apparatus 400, from the learning scheme ID and learning schemes that are able to be executed by the second learning unit 504 (S330).

In a case in which the second learning unit 504 is able to execute the same learning scheme, the learning scheme selection unit 502 determines continuation of the process in accordance with the same scheme (S331). The learning scheme selection unit 502 stores, in the second learning process information storage unit 503, the learning process information with the content number assigned for specifying the video content stored in the second storage unit, and notifies the second learning unit 504 to continue the process. The second learning unit 504, when receiving this notification, refers to the learning process information newly added to the second learning process information storage unit 503, and continues the learning process from the next learning accuracy using the specified learning scheme.

On the other hand, in a case in which in S330 the second learning unit 504 is not able to execute the same learning scheme as that in the first image processing apparatus 400, the learning scheme selection unit 502 compares learning schemes that are able to be executed with the learning scheme executed in the first image processing apparatus 400 (S332). Then, in a case in which it is determined that any of the learning schemes able to be executed by the second learning unit 504 is inferior to the learning scheme carried out by the first image processing apparatus 400 (the first learning unit 401), the learning scheme selection unit 502 determines that the learning process is not to be continued (S333) Thus, in the second image processing apparatus 500, in a case in which the video content transferred from the first image processing apparatus is subjected to a resolution conversion process, a resolution conversion equation is used which has the provisional coefficients A to H included in the learning process information as ultimately determined coefficients.

In S332, in a case in which it is determined that the second learning unit 504 is able to execute a learning scheme which is superior to the learning scheme carried out in the first image processing apparatus 400, the learning scheme selection unit 502 discards the learning process information received from the first image processing apparatus (S334) More specifically, the learning scheme selection unit 502 determines that a new learning process is carried out in the second learning unit 504 with the use of the learning scheme which is superior to the learning scheme carried out in the first image processing apparatus (S335).

Then, the learning scheme selection unit 502 changes the learning scheme ID of the learning process information received from the first image processing apparatus, stores the learning process information with the variable portion discarded in the second learning process information storage unit 503, and notifies the second learning unit 504 to continue the process. The second learning unit 504, when receiving this notification, refers to the learning process information newly added to second learning process information storage unit 503 and carries out the learning process from the first learning accuracy using the specified learning scheme.

The learning results obtained by the continued process or the new process in the second image processing apparatus as described above can be reported to the first image processing apparatus in the way as described in the first embodiment.

As described above, according to the present embodiment, even in a case in which the first image processing apparatus 400 is not able to complete learning of coefficients of a resolution conversion equation, learning can be continued in the second image processing apparatus 500. Therefore, in an image processing apparatus in which a learning process is carried out as non-real-time processing, if the process has to be interrupted, it is possible to continuously carry out the process in another image processing apparatus and the time to completion of the process can be thus reduced.

In addition, in the second image processing apparatus 500, in a case in which it is possible to execute a learning scheme from which better results can be obtained than from the learning scheme executed in the first image processing apparatus 400, the learning scheme from which better results can be obtained is used to start the learning process again. Therefore, more favorable results can be obtained than in the case of carrying out the process in accordance with the previous learning scheme. In this case, notifying the apparatus which has transferred the learning process (the first image processing apparatus) of the learning results also allows the apparatus which has transferred the learning process to use more favorable results than results obtained by the apparatus itself.

Other Embodiments

It is to be noted that the case in which the increase in processing load, which causes the first image processing unit to interrupt image processing, results from a request for viewing of video content has been described as an example in the embodiments described above. However, the detail of the process is not limited as long as the process causes the processing load of the first control unit 120 to exceed a threshold value.

In addition, for convenience of explanation and understanding, the case in which only one type of image processing is applied to video content has been described in the embodiments described above. However, even in a case in which image multiple types of processing are sequentially applied, it is possible to transfer the processes in the same way.

For example, a case is contemplated in which frames subjected to resolution conversion are further subjected to a color correction process. In such a case, video content to be processed includes three types of frames:

frames which have been subjected to both of resolution conversion and a color correction process;

frames which have been subjected to only resolution conversion; and unprocessed frames, which are mixed therein.

In this case, according to the first and second embodiments, the first image processing information storage unit 105 stores and revises two types of image processing information, for the resolution conversion process and for the color correction process. Then, when the processes are taken over, the both types of image processing information are multiplexed with video content and transferred to the second image processing apparatus. In the second image processing apparatus, the image processing to be continued and the initiation frame can be determined based on individual pieces of the image processing information.

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-99750, filed on Apr. 5, 2007, which is hereby incorporated by reference herein its entirety.

What is claimed is:

1. An image processing apparatus that applies image processing to each of a plurality of frames constituting stored video content, comprising:

an image processing unit that sequentially applies image processing for improving image quality to the plurality of frames constituting the video content from a first frame;

a storage unit that stores image processing information that includes information relating to detail and progress of the image processing; and a transfer unit that, in a case in which the image processing is interrupted after the image processing has been applied to a part of the plurality of frames constituting the video content, transfers the video content and the image processing information regarding the image processing to another image processing apparatus in order to apply the image processing to the frames, within the video content, to which the image processing has not been applied, wherein the information relating to detail of the image processing included in the image processing information regarding the image processing includes information relating to a kind of the image processing, and wherein the information relating to progress of the image processing included in the image processing information regarding the image processing is frame number information which indicates a last frame, within the video content, to which the image processing has been applied, and wherein the transfer unit transfers the video content and the video processing information using a content for transfer in which the image processing information is multiplexed with the video content.

2. The image processing apparatus according to claim 1, wherein the image processing unit interrupts the application of the image processing in a case in which, during application of the image processing to the video content, the application of the image processing cannot be continued due to a priority process.

3. The image processing apparatus according to claim 1, wherein the content for transfer complies with Moving Picture Expert Group 2-Transport Stream (MPEG2-TS) format and the image processing information is multiplexed to the content for transfer as a new section in the MPEG2-TS format.

4. An image processing apparatus having an image processing unit capable of applying image processing to each of a plurality of frames constituting video content, the image processing apparatus comprising:

a receiving unit that receives from another image processing apparatus video content and image processing information that includes information relating to a kind of an image processing that the other image processing apparatus has applied to a part of the plurality of frames of the video content and frame number information which indicates a last frame, within the video content, to which the image processing has been applied; and a selection unit that selects an image processing to be carried out by the image processing unit based on the information relating to the kind of the image processing included in the image processing information received by the receiving unit, wherein the image processing unit applies the image processing selected by the selection unit to frames of the plurality of frames constituting the video content, received from the other image processing apparatus, from a frame of the video content next to the frame indicated by the frame number information.

5. A control method for an image processing apparatus that applies image processing to each of a plurality of frames constituting stored video content, the control method comprising:

sequentially applying image processing for improving image quality to the plurality of frames constituting the video content with an image processing unit from a first frame;

storing in a storage unit image processing information that includes information relating to detail and progress of the image processing; and transferring, in a case in which the image processing is interrupted after the image processing has been applied to a part of the plurality of frames constituting the video content, the video content and the image processing information regarding the image processing to another image processing apparatus in order to apply the image processing to the frames, within the video content, to which the image processing has not been applied, wherein the information relating to detail of the image processing included in the image processing information regarding the image processing includes information relating to a kind of the image processing, and wherein the information relating to progress of the image processing included in the image processing information regarding the image processing is frame number information which indicates a last frame, within the video content, to which the image processing has been applied, and wherein the transferring comprises transferring the video content and the video processing information using a content for transfer in which the image processing information is multiplexed with the video content.

6. The control method according to claim 5, wherein the application of the image processing interrupts in a case in which, during the application of the image processing to the video content, the application of the image processing cannot be continued due to a priority process.

7. The control method according to claim 5, wherein the content for transfer complies with MPEG2-TS format and the image processing information is multiplexed to the content for transfer as a new section in the MPEG2-TS format.

8. A control method for an image processing apparatus having an image processing unit capable of applying image processing to each of a plurality of frames constituting video content, the control method comprising:

receiving from another image processing apparatus video content and image processing information that includes information relating to a kind of an image processing that the other image processing apparatus has applied to a part of the plurality of frames of the video content and frame number information which indicates a last frame, within the video content, to which the image processing has been applied;

selecting an image processing to be carried out by the image processing unit based on the information relating to the kind of the image processing included in the image processing information received in the receiving step; and applying the image processing selected in the selecting step to frames of the plurality of frames constituting the video content, received from the other image processing apparatus, from a frame of the video content next to the frame indicated by the frame number information using the image processing unit.

* * * * *